Sept. 26, 1961    L. L. E. SUOMINEN    3,001,568
TIRE FOR VEHICLE WHEELS
Filed Jan. 28, 1959    3 Sheets-Sheet 2

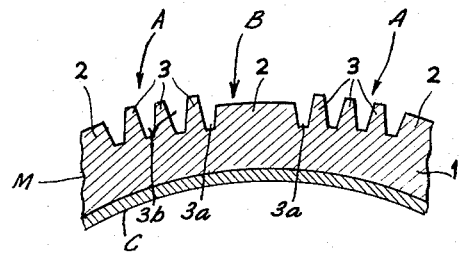
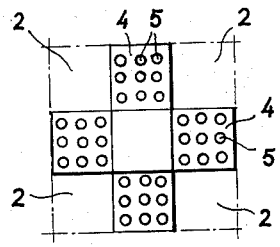
FIG.1　　　　　　FIG.7
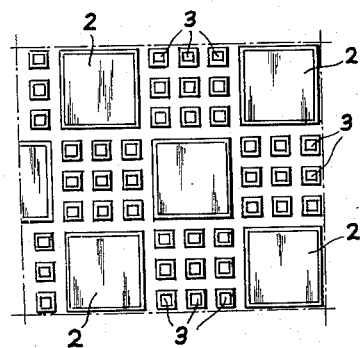
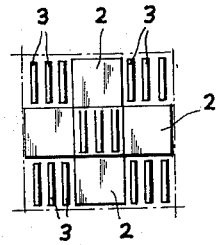
FIG.2　　　　　　FIG.3
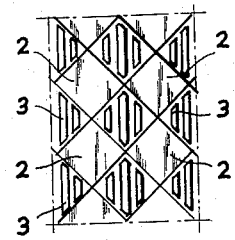
FIG.4
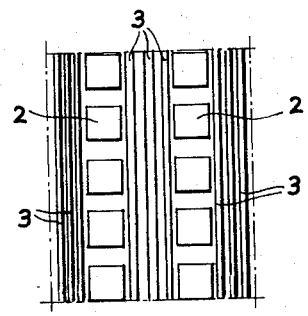
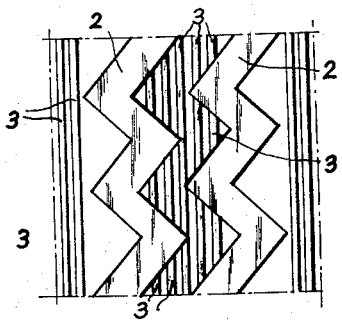
FIG.5　　　　　　FIG.6

United States Patent Office 3,001,568
Patented Sept. 26, 1961

3,001,568
TIRE FOR VEHICLE WHEELS
Lauri Leevi Ensio Suominen, Nakkila, Finland
Filed Jan. 28, 1959, Ser. No. 789,637
Claims priority, application Sweden Jan. 30, 1958
15 Claims. (Cl. 152—209)

This invention relates to tires for wheels of vehicles such as motor cars, motorcycles and aircraft. The invention is suitable for tires with inner tubes as well as for tubeless tires.

The invention is concerned with tires in which the tread surface has a pattern comprising upwardly protruding lower and higher elevations separated from one another by narrow groove-like spaces. The main feature of the tread pattern according to the invention is that it comprises regularly alternating lower and higher elevations. The higher elevations are arranged as groups of at least two equally high elevations, the base projections of which against the tread surface are smaller than that of the lower elevations. The groove-like spaces between said higher elevations as well as between the group of the higher elevations and the lower elevations are of equal depth.

A tire construction according to the present invention has many advantages compared with known tire types. The higher elevations formed according to the invention guarantee an effective grip on the road surface, prevent the tire from sliding and render an even and smooth driving.

According to a preferred embodiment of the invention, the base projection of the lower elevations on the tread surface is substantially equal to the base projection of all of the higher elevations of a group.

In use, when the tire is loaded and its tread pressed against the road surface, the higher elevations will be more compressed than the lower elevations, so that their top level coincides with the top level of the lower elevations. Thus a greater compression is created in the higher elevations than in the lower elevations. When the tire tread under such conditions encounters small holes and unevenness in the road the higher elevations like highly compressed spring elements will snap into such holes and thereby contribute to an extraordinary effective grip, preventing the tire from sliding and simultaneously making the run of the tire smooth and agreeable.

The form and dimensions of the higher elevations are further so arranged that, when they are loaded and thus are compressed, their base projections become enlarged and the grooves between the elevations diminish to such an extent that the total area of the higher elevations in each group will amount to roughly 75% to 95% of the area of the sum of the elevations, when unloaded, and the area of their intervening spaces at such conditions.

It is another feature of the invention that the higher and the lower elevations are all made of the same material.

The above mentioned characteristics are illustrated in the annexed drawing which shows some preferred embodiments of the invention.

In the drawing:

FIG. 1 is a vertical section through a part of a tire.

FIGS. 2 to 9 show fragments of various different pattern embodiments of tires according to the invention.

Figure 9:
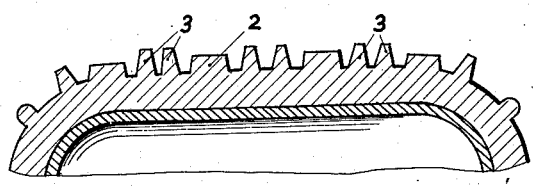

Corresponding parts in the various figures are designated by the same references. The tire 1 has lower elevations 2 and higher elevations 3 constituting respective tread portions A and B extending transversely and longitudinally of the tire. The width and length dimensions of the groups formed by the higher elevations 3 correspond in some suitable embodiments mainly with the same sizes of the lower elevations 2. Between portions A and B are groove-like intervening spaces 3a having a uniform depth of penetration into material M on carcass C. Further, each portion A comprises at least two projections or elevations 3 between which are groove-like intervening spaces 3b having a depth of penetration equal to that of spaces 3a.

In FIG. 2 the higher elevations 3 consist of several plug-like elements placed at some distance from another separated by groove-like spaces. The groups of the elevations 3 alternate regularly with the lower elevations 2. The form of the base projection of the higher elevations might as illustrated in FIGS. 3 to 9 vary in different ways, being squares, longitudinal, circular and so on.

The surface of the tire according to FIG. 3 corresponds with the surface in FIG. 2 only with the difference that the elevations 3 have an elongated form.

In the embodiment according to FIG. 4 the side lines of the lower square elevations 2 are at an angle of 45° with the median line of the tire. The higher elevations 3 are of elongated form and are situated in parallel with the median line of the tire.

In FIG. 5 the lower elevations 2 on the tire surface are arranged as transverse ribs relative to the geometrical median-line of the tire, while the higher elevations are arranged as ridges in parallel to said median line.

According to FIG. 6 there is on the outer edges of the tire formed a group of elevations, extending as ridges along the whole circumference of the tire. On the inside of these ridges run two zig-zag lower elevations 2, and between them parallel higher ridges 3 encircling the tire in parallel with its median line.

The higher elevations 4 in the embodiment shown in FIG. 7 are separated from another by means of circular excavations 5.

Figure 8:
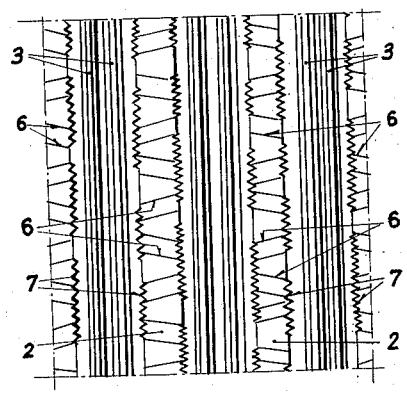

FIGS. 8 and 9 show a sectional and a top view respectively of a tread pattern in which the groups of higher elevations 3 are formed by two parallel, circumferential ridges running around the tire in its median-line direction. The lower elevations alternating with the higher elevations have been formed by a single broader ridge 2, which is cut along lines 6 transversely to the median-line to the tire but arranged at somewhat different angles relative said median line so as to form a series of differently shaped elevations. The longitudinal sides 7 of the lower elevations are zig-zag-formed in known manner.

Figure 10:
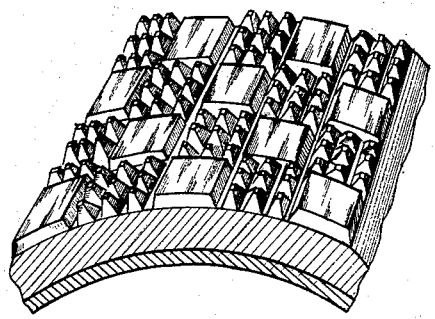
FIG. 10 is a perspective view of a part of a tire, the tread pattern of which corresponds to FIG. 2.

FIG. 10 is as earlier indicated a perspective view of the tread pattern according to FIG. 2.

Figure 11:
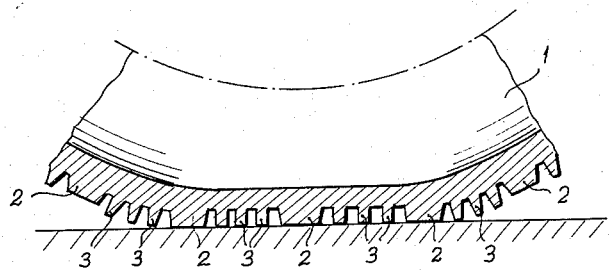
FIGS. 11 and 12 show respectively, in axial and transverse section, a tire of the invention under load.
Figure 12:
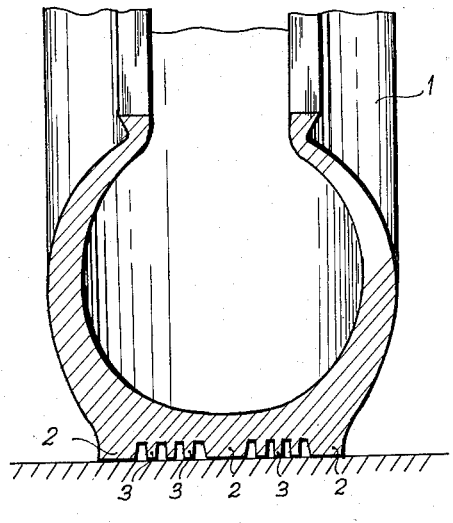

FIGS. 11 and 12 show a tire of the invention under load.

The invention is not limited to the tire patterns shown since it is possible to vary the form of the elevations in many other ways within the scope of the invention.

What I claim is:

1. A tire for wheels of vehicles having an inner carcass portion and an outer road engaging material having a treated pattern thereon, said tread pattern comprising: first and second alternating adjacent tread portions, said first portions having a higher elevation than said second portion, said first and second portions defining groove-like intervening spaces therebetween, said spaces having an equal depth of penetration, said first portion being provided with further groove-like intervening spaces having a depth of a penetration equal to the depth of penetration of said intervening spaces between the first and second portions, said spaces in said first portion forming a plurality of relatively narrow flexible members so that with said tire loaded, said flexible members are enabled to be compressed to a higher degree than said second portion whereby said portions are compressed to equal elevations, thereby providing an increased gripping action of the tread pattern.

2. A tire as claimed in claim 1, in which said first and second portions extend in a direction parallel to the median line of the tire.

3. A tire as claimed in claim 2, in which said members include ridges encircling the circumference of the tire, and said second portions each includes transverse ribs positioned between said first portions in a direction parallel to the median line of the tire and between adjacent ribs in a direction transverse to the median line of the tire.

4. A tire as claimed in claim 2, in which said members include ridges encircling the circumference of the tire, and said second portions each includes a zig-zag portion positioned between two of said first portions and extending in a direction substantially parallel to the median line of the tire, the outer portions and center portion of the tire being provided with said first portions of higher elevation with said second portions of lower elevation being provided therebetween.

5. A tire as claimed in claim 2, in which said members include ridges encircling the circumference of the tire, and said second portions each includes a pair of substantially parallel sides with parts thereof in zig-zag formation encircling the circumference of the tire in a direction parallel to the median line thereof, and each having a first elevation formed by a first pair of parallel cuts in a direction transverse to the median line of the tire and a second elevation formed by a second pair of parallel cuts in a second direction transverse to the median line of the tire, said first and second pair of parallel cuts alternating uniformly about the circumference of the tire to form a series of different shaped elevations.

6. A tire for wheels of vehicles having an inner carcass portion and an outer road engaging material having a tread pattern thereon, said tread pattern comprising: first and second tread portions alternately positioned to form a uniformly distributed checkerboard of equal alternating squares on said outer material, said first portion having a higher elevation than said second portion, said first and second portions defining groove-like intervening spaces therebetween, said spaces having an equal depth of penetration, said first portion being provided with further groove-like intervening spaces to form a plurality of relatively narrow flexible members so that with said tire loaded, said flexible members are enabled to be compressed to a higher degree than said second portion whereby said portions are compressed to equal elevations, thereby providing an increased gripping action of the tread pattern.

7. A tire as claimed in claim 6, in which said portions each includes a rectangularly-shaped element projecting from said outer material, the long sides of said element being parallel to the median line of the tire.

8. A tire as claimed in claim 6, in which one edge of said first and second portions are at an angle of 45° with the median line of the tire, and said members have two parallel sides and two non-parallel sides, said parallel sides being parallel to the median line of the tire.

9. A tire as claimed in claim 6, in which said members have a raised portion provided with indentations therein forming said second spaces.

10. A tire as claimed in 6 wherein the further groove-like intervening spaces in the first portion have an equal depth of penetration as the groove-like intervening spaces defined by the first and second portions.

11. A tire as claimed in claim 10 wherein said squares have sides parallel to the median line of the tire.

12. A tire as claimed in claim 10 wherein said squares have sides inclined with respect to the median line of the tire.

13. A tire for wheels of vehicles having an inner carcass portion and an outer road engaging material having a tread pattern thereon, said tread pattern comprising: a plurality of adjacent circumferential elements, each element including alternating first and second square portions, each of said circumferential elements defining a groove-like intervening space between adjacent elements, said first and second portions defining a second groove-like intervening space therebetween, the depth of penetration of the first said groove-like intervening space being equal to the depth of penetration of the second groove-like intervening space, one of said portions having a higher elevation than the elevation of the other portion, said one portion being provided with further groove-like intervening spaces to form a plurality of relatively narrow flexible members so that with said tire loaded, said flexible members are enabled to be compressed to a higher degree than said second portion whereby said portions are compressed to equal elevations, thereby providing an increased gripping action of the tread pattern.

14. A tire as claimed in claim 13 wherein adjacent circumferential elements are juxtaposed whereby first portions of one of the circumferential elements are adjacent second portions of the adjacent circumferential elements.

15. A tire as claimed in claim 14 wherein the further groove-like intervening spaces in said one portion have an equal depth of penetration as the first and second groove-like intervening spaces.

References Cited in the file of this patent

UNITED STATES PATENTS

| | | |
|---|---|---|
| 1,701,482 | Hower | Feb. 5, 1929 |
| 2,197,662 | Hughes | Apr. 16, 1940 |
| 2,605,807 | Wittmer | Aug. 5, 1952 |

FOREIGN PATENTS

| | | |
|---|---|---|
| 357,419 | Great Britain | Sept. 24, 1931 |